Patented Nov. 12, 1935

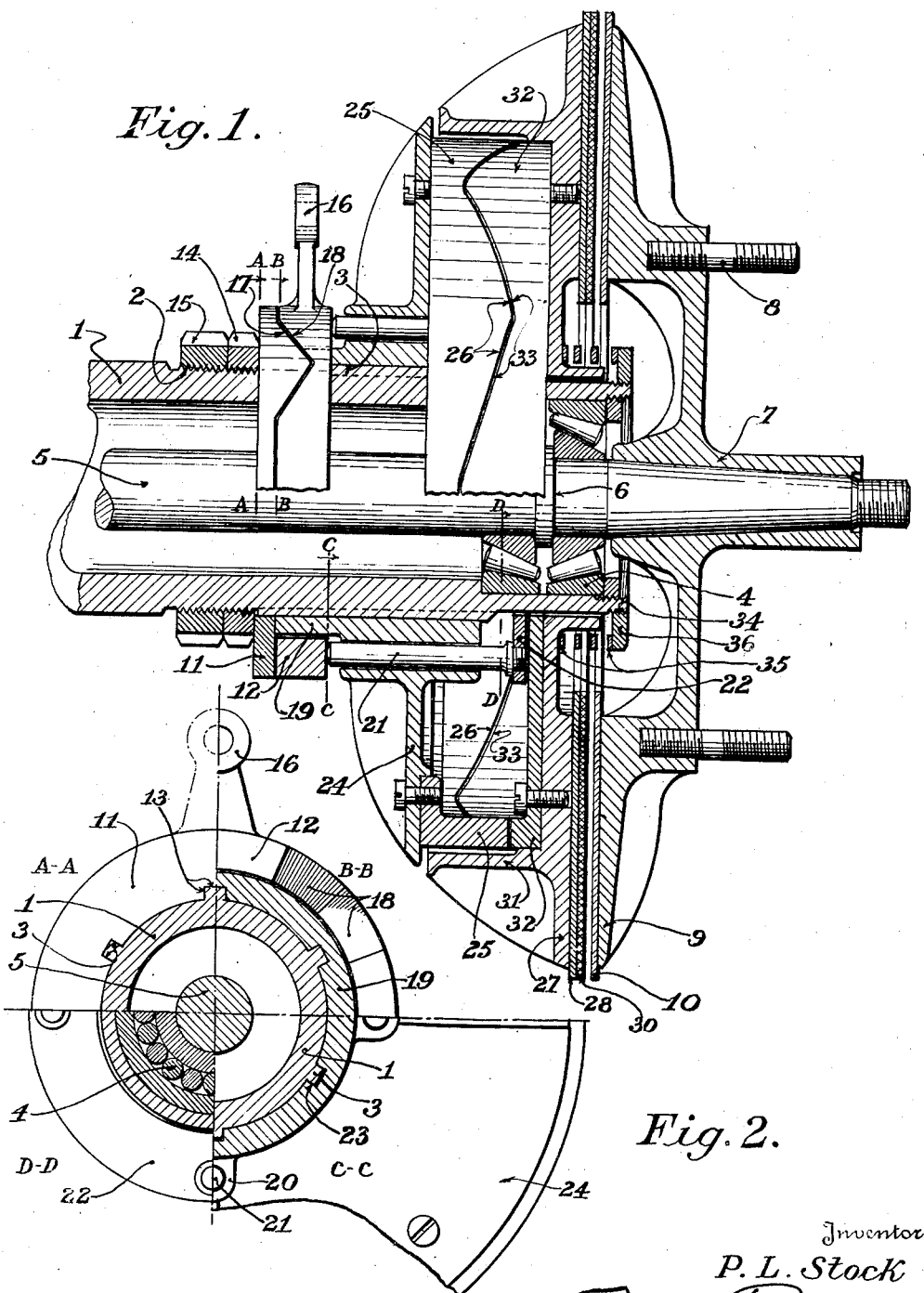

2,020,809

UNITED STATES PATENT OFFICE 2,020,809

SELF-ENERGIZING BRAKE

Philip L. Stock, Bayfield, Colo.

Application April 10, 1934, Serial No. 719,920

5 Claims. (Cl. 188—140)

This invention relates to a disc self-energizing brake and it consists in the novel features hereinafter described and claimed.

An object of the invention is to provide a brake structure adapted to be applied to the wheels of any motor or engine driven vehicle or industrial machine where a brake structure is used, and which is simple in structure and arrangement and which may be easily and quickly adjusted.

A further object of the invention is to provide a brake mechanism moving friction disc plates with a friction member interposed between them, one of the said discs being carried by the axle and the other by the axle housing and with a friction member interposed between the disc plates, there being further provided means for moving one of the disc plates whereby the friction member is clamped between the plates to provide the braking or arresting effect upon the parts.

A still further object is to provide means for utilizing said frictional arresting action to cause the disc plates to be moved closer toward each other and whereby the friction member is firmly clamped between the friction members.

With the above and other objects in view it is particularly pointed out that this brake may be used in a plurality of forms without departing from the idea of the invention.

In the accompanying drawing:

Figure 1 is a transverse sectional view of the disc self-energizing brake with fragments of parts thereof shown in elevation.

Figure 2 is a transverse sectional view of an axle and axle housing with the brake mounted thereon and showing the brake mechanism cut upon four distinct planes, the plane of the quadrant A—A being cut upon the line A—A of Figure 1; the plane of the quadrant B—B being cut upon the line B—B; the plane of the quadrant C—C being cut upon the line C—C and the plane of the quadrant D—D being cut upon the line D—D of said Figure 1.

As illustrated in the accompanying drawing the axle housing 1, is provided upon its exterior surface with a thread 2 and a series of spline ridges 3. Anti-friction bearing members 4 are located in the housing and receive the end portion of an axle 5. Said axle is provided with an annular flange 6 which is located between the bearing members and prevents longitudinal movement of the axle with relation to the bearings and housing.

A hub 7 is mounted upon the axle and is provided with a series of studs 8 which may be employed for attaching a wheel, (not shown) to the hub in a usual manner. A disc flange 9 is formed integral with the hub and carries upon its inner face a friction plate 10.

Rings 11 and 12 surround the axle housing and the ring 11 is provided with grooves 13 which receive the spline ridges 3 as best shown in Figure 2 of the drawing. A nut 14 is screwed upon the thread 2 and bears against the side of the ring 11 and a nut 15 is also screwed upon said thread and serves as a jamb or an abutment for holding the nut 14 securely in position upon the axle housing and against the ring 11.

The ring 12 is provided with an outstanding lug 16 to which an operating rod (not shown) may be attached in a usual manner. The ring 11 is provided upon its inner face with V-shaped tenons 17 which are housed in V-shaped mortises 18 provided in the ring 12. The ring 12 may be turned upon the axle housing by strain applied to the lug 16 and when so turned the walls of the mortises 18 ride upon the edges of the tenons whereby the ring 12 moves laterally with relation to the ring 11.

A sleeve 19 surrounds the housing and is provided at its exterior with lugs 20 in which are slidably retained pins 21. The said pins at one end bear against the side of the ring 12 and the other ends of the pins are attached to a ring 22 which also surround the said housing. One end of the sleeve is received in the ring 12, as best shown in Figure 1 and the sleeve is provided with grooves 23 which receive the spline ridges 3. A plate 24 is carried by the sleeve and forms a part thereof. A drum member 25 is attached to the plate 24 and is provided with a zig-zag edge 26.

A disc 27 is mounted upon the axle housing and carries a friction plate 28. A friction ring 30 is carried upon the plate 28 and is interposed between the plates 10 and 28 as best shown in Figure 1. The disc 27 is provided with an annular flange 31 and a drum member 32 is mounted upon the plate 27, and is provided with a zig-zag edge 33 which is juxtaposed with relation to the edge 26 of the drum member 25. Said drum members are housed in the flange 31 and the plate 24 serves as a side for the casing thus formed for the drum members. The side of the ring 22 may bear against the intermediate area of the drum member 32 when the pins are moved longitudinally as hereinbefore described and thus means are provided for tightly clamping the friction ring 30.

A nut 34 is screwed upon the end of the axle housing 1 and a coil spring 35 is interposed between the said nut and the hub 36 of the plate 27. The said spring is under tension whereby the friction ring 30 is held normally out of engagement with the friction plate 10 as best shown in Figure 1 of the drawing.

When the ring 12 is turned as hereinbefore described and through the intervening parts the ring 22 moves the plate 27 toward the plate 9 the friction member 30 is clamped between said plates and the friction thus produced will cause the zig-zag edge 33 of the drum member 32 to ride upon the zig-zag edge 26 of the drum member 25 and thus the intermediate portions of said drum members are moved away from each other. Therefore the friction member 30 is more tightly clamped between the plates 27 and 9, thus increasing the friction and quickly fixing the said parts with relation to each other.

When it is desired to adjust the parts, to compensate for wear or other reasons the nuts 14 and 15 may be turned to adjust the intervening parts to the desired position.

It is to be understood that various modifications including the making of certain parts in one unit, and of the deviations not herebefore mentioned but which are included within the scope of the appended claims may be made without departing from the spirit of the invention.

I claim:

1. In combination with a wheel, an axle and a non-rotating member having a housing, a disc self-energizing brake comprising a disc plate carried by the axle and having a friction plate, a disc plate slidable upon the housing and having a friction plate opposite the first mentioned friction plate, a friction member interposed between said disc plates, drum members carried by the axle housing and the slidable disc plate respectively, said drum members having zig-zag opposed edges, and means for moving the drum members laterally with relation to each other to clamp the friction member between the disc plates.

2. In combination with a wheel, an axle and a non-rotating member having a housing, a disc plate carried by the axle and having a friction plate, a disc plate slidable upon the housing and having a friction plate opposite the first mentioned friction plate, a friction member interposed between said disc plates, drum members carried by the axle housing and the slidable plate, said drum members having zig-zag opposed edges and means for moving the drum members with relation to each other.

3. In combination with a wheel, an axle and a non-rotating member having a housing, a disc plate carried by the axle and having a friction plate, a disc plate slidable upon the housing and having a friction plate opposite the first mentioned friction plate, a friction member interposed between said disc plates, drum members carried by the axle housing and the slidable plate, said drum members having zig-zag opposed edges, means for moving the drum members with relation to each other and spring means for holding the friction plates away from each other.

4. In combination with a wheel and a non-rotating member having a housing, a disc plate slidable upon the housing and having a friction plate, a disc plate fixed to the axle and having a friction plate, a friction member interposed between said friction plates, drum members carried by the axle housing and the slidable plate, said drum members having zig-zag opposed edges, a ring bearing against one drum member, pins carried by the ring, means for moving the pins and spring means for holding the friction plates away from each other.

5. In combination with a wheel and a non-rotating member having a housing, a disc plate slidable upon the housing and having a friction plate, a disc plate fixed to the axle and having a friction plate, a friction member interposed between said friction plates, drum members carried by the axle housing and the slidable plate, said drum members having zig-zag opposed edges, a ring bearing against one drum member, pins carried by the ring, a second ring turnable upon the axle housing, means for moving the last mentioned ring laterally when turned and said turnable ring bearing against the ends of the pins.

PHILIP L. STOCK.